(No Model.)
J. W. LEEK.
TWO WHEELED VEHICLE.
No. 393,989. Patented Dec. 4, 1888.
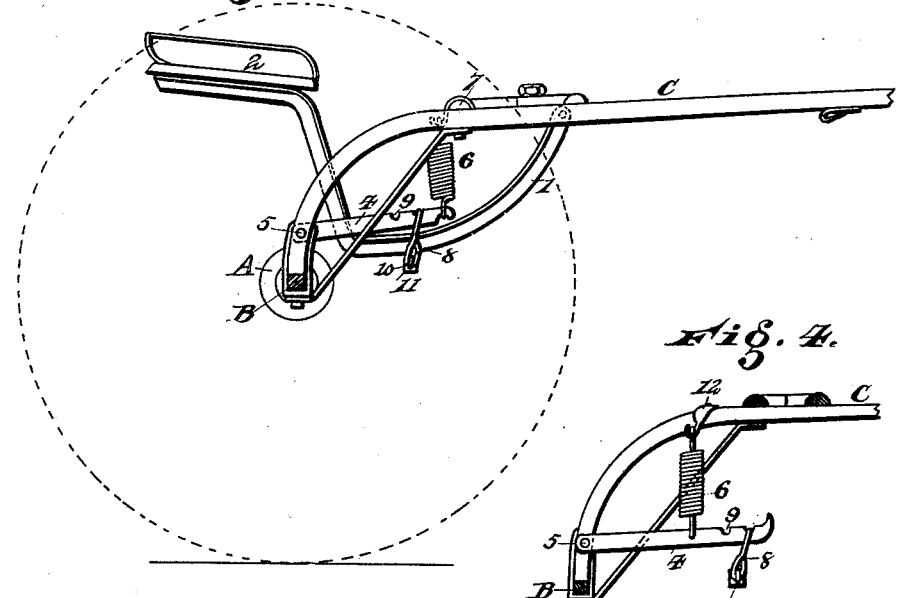
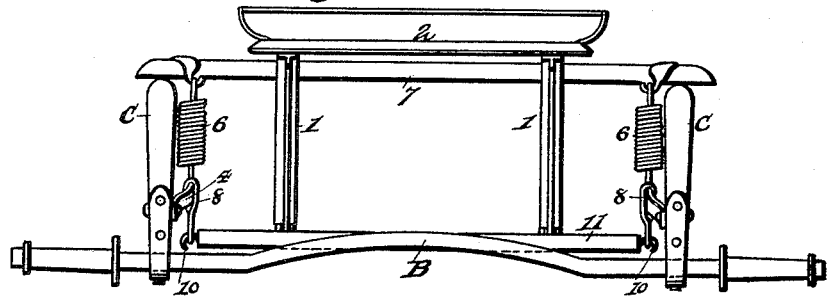
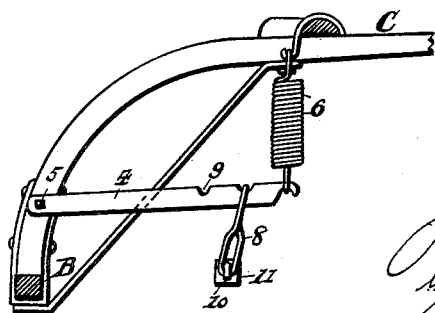
Attest.
J. Watson Sims
T. Simmons
Inventor.
John W. Leek
by Wood & Boyd
his Attorneys &c

UNITED STATES PATENT OFFICE.

JOHN W. LEEK, OF CINCINNATI, OHIO.

TWO-WHEELED VEHICLE.

SPECIFICATION forming part of Letters Patent No. 393,989, dated December 4, 1888.

Application filed May 17, 1888. Serial No. 274,208. (No model.)

*To all whom it may concern:*

Be it known that I, JOHN W. LEEK, of Cincinnati, in the county of Hamilton and State of Ohio, have invented certain new and useful Improvements in Two-Wheeled Vehicles, of which the following is a specification.

My invention relates to that class of two-wheeled vehicles in which the body is suspended by means of a fulcrum-lever and spring.

The object of my invention is, first, to produce a connection of the body to the fulcrum and spring in such a way as to employ the longest lever movement, and consequently obtaining an easier springy movement of the body, lessening the jars and shocks received by the occupant of the vehicle.

The features of my invention will be fully set forth in the description of the accompanying drawings, making a part of this specification, in which—

Figure 1 is a side elevation of my improvement. Fig. 2 is a rear elevation. Fig. 3 is a side elevation of the spring and fulcrum detached. Fig. 4 is a modification of Fig. 3.

A represents the hub of the wheel.

B represents the axle.

C represents the thills.

1 represents the sills of the body, preferably made of T-steel, the rear ends being bent up to form the bracket 2 for the seat 3.

4 represents a lever pivoted to the thills or center 5.

6 represents a coil-spring, preferably attached to the cross-bar 7 on either side, as shown in Fig. 2.

8 represents twisted links, one eye of which, passing over the lever 4, engages in notches 9, and the other end engages in the hook or eye 10, attached to the end of the cross-bar 11 of the side sills composing the body of the vehicle. Two notches are shown on the lever 4, so as to adjust the link 8 backward or forward to accommodate the vehicle to the different weights to be employed. It will be observed that by this method of connection with the link 8 one side may be adjusted in the forward notch and the opposite side in the rear notch to accommodate the vehicle to the weights of a light and heavy person, thus securing an easier riding vehicle than where the weight upon one spring is much greater than the other. These links are easily adjusted, and being near the forward end of the lever 4 a longer sweep of the said lever is obtained, and consequently the shakes and jars conveyed to the body are less in correspondence with the increased length of the lever.

In the modification, Fig. 4, the spring 6 is attached to a shackle, 12, that passes around the thill C, and the lower end of the spring engages with an eye in the lever 4. The notches 9 are in front of the spring, and the forward end of the lever 4 is upturned to prevent the link 8 from coming off. The movement of the body is a little greater with the same length of lever when the parts are connected as shown in Fig. 4 than when connected as shown in the other figures.

Having described my invention, what I claim is—

1. In combination with a two-wheeled vehicle, the lever 4, pivoted at one end to the thills, the opposite end engaging with the spring, and the body suspended upon the lever between its spring and fulcrum, substantially as specified.

2. In a two-wheeled vehicle, the combination of the lever 4, pivoted to the thills, the spring 6, attached to said lever forward of the pivot, the links 8, adjustably engaged with notches 9 on the forward end of said lever, and the body attached to the lower end of said links, substantially as specified.

In testimony whereof I have hereunto set my hand.

JOHN W. LEEK.

Witnesses:
CHARLES THEODORE GREVE,
J. WATSON SIMS.